(12) United States Patent
Houle (10) Patent No.: US 8,562,832 B2
(45) Date of Patent: Oct. 22, 2013

(54) THREE-STAGE SLURRY PROCESSING APPARATUS AND METHOD

(76) Inventor: Rejean Houle, Tulare, CA (US)

( * ) Notice: Subject to any disclaimer, the term of this patent is extended or adjusted under 35 U.S.C. 154(b) by 63 days.

(21) Appl. No.: 13/282,395

(22) Filed: Oct. 26, 2011

(65) Prior Publication Data

US 2013/0105409 A1     May 2, 2013

(51) Int. Cl.
*B01D 29/72* (2006.01)
*B07B 1/00* (2006.01)
*B07B 1/12* (2006.01)

(52) U.S. Cl.
USPC ........... 210/255; 210/258; 210/262; 210/297; 210/323.1; 210/388; 210/407; 210/416.1; 209/17; 209/268; 209/269; 209/273; 209/274; 209/282

(58) Field of Classification Search
None
See application file for complete search history.

(56) References Cited

U.S. PATENT DOCUMENTS

| | | | |
|---|---|---|---|
| 1,703,726 A | 2/1929 | Davis | |
| 1,729,965 A | 10/1929 | Reynolds | |
| 2,061,812 A | 11/1936 | Slater | |
| 2,091,503 A | 8/1937 | Ferriss, Sr. | |
| 2,095,504 A | 10/1937 | Kesti | |
| 2,329,773 A * | 9/1943 | Leahy | 209/310 |
| 3,568,839 A | 3/1971 | Dunlea | |
| 3,666,091 A | 5/1972 | Ludlum | |
| 3,929,642 A | 12/1975 | Ennis | |
| 3,950,562 A | 4/1976 | Senior | |
| 3,970,549 A * | 7/1976 | Ennis et al. | 209/341 |
| 4,113,626 A * | 9/1978 | Detcher | 210/409 |
| 4,664,790 A | 5/1987 | Lundqvist | |
| 4,666,602 A | 5/1987 | Hartzell | |
| 4,990,249 A | 2/1991 | Leuenberger | |
| 5,268,100 A | 12/1993 | Hartzell | |
| 5,330,643 A * | 7/1994 | Webb et al. | 210/255 |
| 5,413,709 A * | 5/1995 | Webb et al. | 210/255 |
| 5,429,247 A | 7/1995 | Lemay et al. | |
| 5,628,912 A | 5/1997 | Nesseth | |
| 5,779,887 A | 7/1998 | Rector et al. | |
| 5,817,241 A | 10/1998 | Brayboy | |
| 5,832,873 A | 11/1998 | Tu | |
| 5,833,868 A | 11/1998 | Bajema | |
| 5,927,513 A | 7/1999 | Hart | |
| 6,190,570 B1 | 2/2001 | Nakamura et al. | |
| 6,241,900 B1 | 6/2001 | Nakamura et al. | |
| 6,273,270 B1 | 8/2001 | Nakamura et al. | |
| 6,354,442 B1 | 3/2002 | Obst | |

(Continued)

OTHER PUBLICATIONS

U.S. Appl. No. 13/282,403 entitled "Vibrating Slot Sieve Slurry Processing Apparatus and Method" filed Oct. 26, 2011, 18 pages.

(Continued)

*Primary Examiner* — Robert James Popovics
(74) *Attorney, Agent, or Firm* — Lewis Roca Rothgerber LLP (57) ABSTRACT

A three-stage separator system for separating the solids and liquids from a slurry includes a first stage having an inclined housing defining a liquid channel. A slot sieve is disposed over an open surface of the channel. A mechanical vibrator assembly imparts mechanical vibration to a vibration zone of the slot sieve. A slurry delivery apparatus delivers the slurry to the slot sieve. A second stage includes an inclined conveyer positioned to convey partially-separated solids and includes a drive mechanism driven at a speed to cause the partially-separated solids to tumble as they are transported up the conveyer. A third stage includes a press positioned to accept partially-separated solids passing out of the tunnel press restrictor.

9 Claims, 5 Drawing Sheets

(56) References Cited

U.S. PATENT DOCUMENTS

| | | | |
|---|---|---|---|
| 6,531,057 B1 | 3/2003 | Houle | |
| 6,672,462 B2* | 1/2004 | Sharkey | 210/409 |
| 6,749,068 B1* | 6/2004 | Dias | 209/132 |
| 6,773,612 B2* | 8/2004 | Dias | 210/767 |
| 6,863,181 B2 | 3/2005 | Dias | |
| 6,889,807 B2 | 5/2005 | Ohishi et al. | |
| 6,892,891 B2* | 5/2005 | Dias | 209/625 |
| 6,926,839 B2* | 8/2005 | Sharkey | 210/767 |
| 7,051,962 B2 | 5/2006 | Whitsel et al. | |
| 7,122,119 B2* | 10/2006 | Gribble et al. | 210/232 |
| 7,673,755 B2 | 3/2010 | Gemmill | |
| 8,147,689 B1 | 4/2012 | Cogar | |
| 8,302,780 B1 | 11/2012 | Mitchell et al. | |
| 2001/0004973 A1 | 6/2001 | Asakawa | |
| 2001/0013492 A1* | 8/2001 | Dias | 210/409 |
| 2003/0089644 A1 | 5/2003 | Hanks | |
| 2003/0094424 A1* | 5/2003 | Dias | 210/768 |
| 2003/0116511 A1* | 6/2003 | Dias | 210/768 |
| 2003/0127375 A1* | 7/2003 | Gribble et al. | 210/101 |
| 2004/0245152 A1* | 12/2004 | Dias | 209/273 |
| 2012/0273403 A1 | 11/2012 | Daniels et al. | |
| 2013/0105369 A1* | 5/2013 | Houle | 209/240 |
| 2013/0105409 A1* | 5/2013 | Houle | 210/770 |
| 2013/0105413 A1* | 5/2013 | Houle | 210/785 |

OTHER PUBLICATIONS

Office action mailed Jan. 2, 2013 in co-pending U.S. Appl. No. 13/282,403, 6 pages.

* cited by examiner

THREE-STAGE SLURRY PROCESSING APPARATUS AND METHOD

BACKGROUND

1. Field of the Invention

The present invention relates to processing of slurries. More particularly, the present invention relates to apparatus and methods for processing slurries.

2. The Prior Art

Many processes in industries such as farming, the food and beverage industry and others, involve the handling of slurries including mixtures of solids and liquids. In a large number of these processes, it becomes necessary at some point to separate the solid components of the slurries from the liquid components of the slurries. A non-exhaustive list of examples of slurries include manure, beer and wine sludge, nut and grain hulls and other food products.

There are numerous reasons to separate out liquid components of slurries. Such purposes include, but are not limited to, waste water processing, clean water recovery, weight reduction prior to hauling solid waste components of a process to reduce transportation costs.

One particular application of the need for separation of solids and liquids from slurries is found in dairy farming. On dairy farms, dairy cows eat and walk on concrete flush lanes. While in these lanes, the cows excrete solid and liquid waste, approximately 15 to 20 gallons of solid waste per cow per day. The solid waste is a valuable commodity and is used for fertilizing as well as creating bedding for cows. Thus, dairy farms pump water from large storage lagoons into the dairy cow flush lanes in order to flush the lanes and collect the solid and liquid waste, in a storage pit from which it is mixed and pumped over a screen separator to remove the solids from the water.

It is known in the art to pump the flushed water, that is water that has already been flushed down the dairy cow flush lane, to a solid waste separator. One known method of separating the solid waste is to use a metal screen filter, onto which the flushed water is pumped. The water passes through the metal screen while a percentage of the solid waste remains on the top surface of the metal screen filter. The solid waste slides off the screen onto a solid waste storage slab. The solid waste then can be removed from the storage slab and used for fertilizer, or it may be further processed into a compost heap to make a more valuable form of fertilizer. Once a percentage of solid waste is removed from the flushed water, the flushed water is drained into a storage lagoon. The flush cycle repeats by pumping water from the storage lagoons down the dairy cow flush lanes.

Given that a typical large dairy farming operation may have 5,000 dairy cows, and 35 dairy cow flush lanes. A typical flush pump used in such an operation has a 2200 gallon per minute capacity. Usually, each dairy cow flush lane has a flush lane valve, which opens for each lane for 5 minutes at a time during each flush cycle. Thus, 2,200 gallons per minute is flushed down each flush lane for 5 minutes, thereby using 11,000 gallons per flush cycle per lane. Since a typical dairy farm has approximately 35 flush lanes, and a typical dairy farmer flushes at least 4 times a day, and each cow produces 15 gallons of waste per day, it follows that about 1,615,000 gallons of water per day must be pumped and processed through the solid waste separator before the water is redirected back to the storage lagoon.

One prior-art system is described in U.S. Pat. No. 6,531,057, issued to the same inventor as the present invention. A solid waste separator is coupled to a conveyor system. The conveyor system moves the solid waste from the solid waste separator up a screen conveyor 320. The conveyor moves the solid waste into a spring loaded tunnel press, which removes excess water from the solid waste. The excess water drains to either the process pit or the storage lagoon through pipe 350. The solid waste drops and stacks into a solid waste stack 340.

A problem in the prior art dairy cow flush lane system is that the flushed water drained from the solid waste separator often contains a high percentage of solid waste. This is due to the fact that the more diluted the solid waste in the water is, the less efficient the metal screen filter is in removing solid waste from the flushed water. Water that contains 0.5% solid waste does not filter as efficiently as water that contains 2% solid waste. This results in dirty water being drained into the storage lagoon. After each flush cycle, the storage lagoon collects more solid waste. Methane gas buildup occurs in the storage lagoon, and the gas is then released into the atmosphere, causing pollution. The water in the storage lagoon is also used to fertilize fields, once the storage lagoon becomes too dirty, the fields and crops can be damaged by the high content of solid waste in the water. Also, as the storage lagoon water contains more solid waste, it becomes more difficult to properly flush the dairy cow flush lanes with the storage lagoon water that already has high levels of solid waste material.

Another drawback to the typical dairy cow flush lane system, is that for every gallon pumped down the flush lane, that same amount of water must first be pumped through a solid waste separator pump, plus any waste collected to the solid waste separator, before being drained back to the storage lagoon. This means that a solid waste separator pump must run for long periods of time due to the high volume of flushed water used and solid waste resulting from flushing the dairy cow flush lanes. Because the solid waste separator pump runs for such a long period of time, there are associated high energy costs to run the pump as well as higher maintenance and repair cost.

It is known to pass a slurry over an inclined slot sieve to remove liquid from a slurry as in the above-described prior-art system. Gravity causes the slurry to courses over the slot sieve. As the slurry descends, the water or other liquid contained in the slurry passes through the slots to a channel that captures the liquid, while and the solids continue down the top surface o the sieve. At the bottom of the sieve, the solids pile up and cascades over a lower edge of the sieve. A removal mechanism, such as a conveyor belt running parallel to the bottom edge of the sieve assembly, may be used to carry away the solids to allow the liquid separation process to be continuous.

A significant problem in the prior art slurry separation systems is that the slots in the sieve become clogged with solid matter, which must be removed or else the operation of the slurry separation system becomes less efficient, with the result that the solid component of the slurry retains an increasing amount of the liquid as the slots become progressively more clogged.

The clogging of the slots requires maintenance measures to be performed to keep the process running satisfactorily. In some instances, a worker is sent to manually hose down the slot sieve to dislodge the solid matter that has accumulated in the slots. Such manual maintenance procedures are labor intensive are generally not completely satisfactory to maintain the system running at top efficiency.

Figure 1:
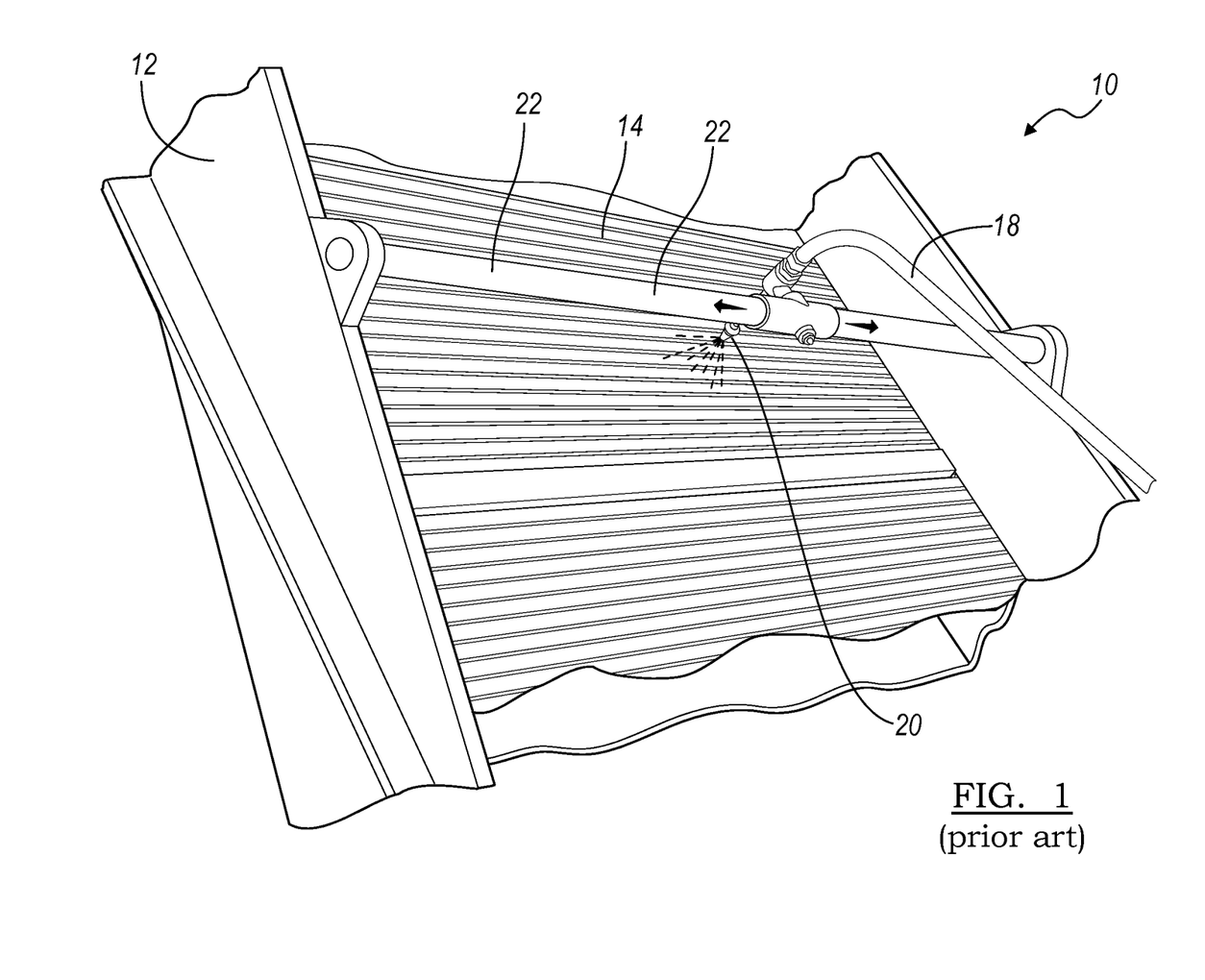
FIG. 1 is a diagram showing a portion of a prior-art slurry processing apparatus.

In some systems attempts have been made to automate this maintenance somewhat. FIG. 1 shows a portion of a typical slot sieve separator including a typical arrangement for dislodging solids from the slot sieve. Separator assembly 10 includes an inclined housing 12 onto which one or more slot sieve sections 14 are mounted to an inclined slot sieve in a slurry separation system. A slurry (not shown) is pumped to the top of the assembly and allowed to run down the slot sieve 14. The slots are spaced apart by a distance that allows the liquid component of the slurry to pass through them into a channel 16 disposed below the slots where it runs to the bottom of the assembly and is carried away by pipes or conduits. The solid component of the slurry passes down the sieve to the bottom, where it may be carried away by means such as a conveyor belt (not shown).

A flexible hose 18 having a nozzle 20 at its end is mounted above the sieve along a track 22 near the top of the separator assembly 10 and is provided with a driving mechanism (not shown) that allows it to be moved horizontally over substantially the entire width of the assembly 10 to direct a stream of water or other liquid at the face of the slots sieve. This method is described in the aforementioned U.S. Pat. No. 6,531,057.

While this arrangement has proved to be superior to reliance on manual hosing maintenance operations, there are several drawbacks to this method including that the water stream is only directed along a small horizontal portion over the entire length of the separator assembly 10. There thus remains room for improvement of processes such as shown in FIG. 1.

BRIEF DESCRIPTION

According to a first aspect of the present invention, a three-stage apparatus and methods for separating the solids and liquids in a slurry are disclosed. In a first of three stages, a liquid channel is oriented at an acute angle such that its top end is positioned higher than a lower end thereof. A slot sieve is disposed over the channel and has top and bottom ends positioned above the top and bottom ends of the liquid channel and includes a plurality of horizontally oriented members spaced apart to define slots therebetween. A slurry delivery apparatus delivers slurry to the top of the slot sieve. A liquid removal conduit is fluidly coupled to the liquid channel at a location proximate to the bottom end thereof. A conveying apparatus is positioned to convey away solids that drop from the bottom end of the slot sieve. A mechanical vibrator assembly is coupled to vibrate at least one of the liquid channel and the slot sieve to dislodge solids from the slots.

In a second of the three steps, the now partially-separated solids are fed onto an inclined conveyor having perforations across its surface. The conveyor is set to run at a speed relative to the volume of partially-separated solids it is carrying so as to cause the partially-separated solids to tumble as they travel up the conveyor. A channel disposed below the conveyor directs the additionally removed liquid to a holding tank or pond, depending on the material being processed. The partially-separated solids pass through a tunnel press restrictor at the top of the conveyor.

In a third of the three steps, the partially separated solids are passed through a roller press having two opposed rollers and positioned at the top of the conveyor. In a preferred embodiment, one of the opposed rollers is a screen roller and the other roller is a rubber faced roller. The separated solids may then be dropped into an accumulation pile.

According to an alternate embodiment of the invention, the partially separated solids are passed through a screw press positioned at the top of the conveyor.

DETAILED DESCRIPTION

Persons of ordinary skill in the art will realize that the following description of the present invention is illustrative only and not in any way limiting. Other embodiments of the invention will readily suggest themselves to such skilled persons.

Figure 2:
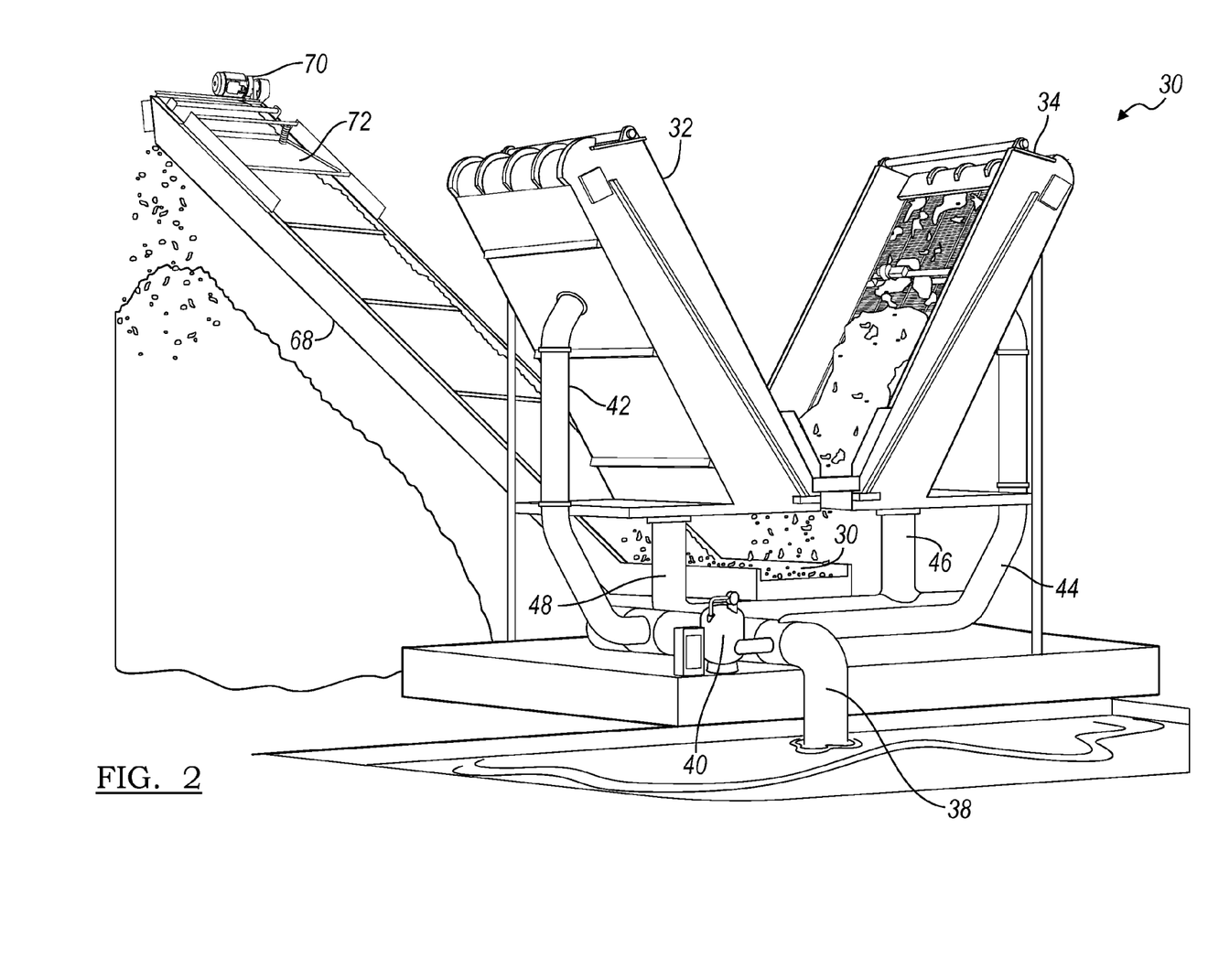
FIG. 2 is a diagram showing a perspective view of a three-stage slurry processing apparatus according to the present invention.

Referring now to FIG. 2, a diagram shows a perspective view of a three-stage slurry processing apparatus 30 according to the present invention. In a first of three stages, a pair of inclined housings 32 and 34 include slot sieves (reference numeral 6 in housing 34) disposed over liquid channels defined by the housings. The housings 32 and 34 are oriented at an acute angle such that their top ends are positioned higher than their lower ends as shown in FIG. 2. The slot sieves 36 include a plurality of horizontally oriented members spaced apart to define slots therebetween. A slurry delivery apparatus including intake conduit 38, pump 40, and delivery conduits 42 and 44 deliver slurry to the top of the slot sieves. Liquid removal conduits 46 and 48 are fluidly coupled to the liquid channel at a location proximate to the bottom end thereof. A more complete description of the housings may be found in co-pending application Ser. No. 13/282,403, entitled "VIBRATING SLOT SIEVE SLURRY PROCESSING APPARATUS AND METHOD" and filed on the same day as the instant application. This application is incorporated herein by reference. Persons of ordinary skill in the art will appreciate that only a single inclined housing such as 32 may be employed at the expense of providing a lower throughput for solid separation.

A horizontal conveying apparatus 50 is positioned to convey away solids that drop from the bottom end of the slot sieve. A mechanical vibrator assembly 52 is coupled to vibrate the slot sieve to dislodge solids from the slots. The mechanical vibrator assembly 52 includes a vibrator motor mounted to a mounting bar. The mounting bar is mechanically coupled to the slot sieve assembly 36. The vibrator motor may be a commercially-available vibrator motor having a rotational speed of, for example, 3,600 rpm. Persons of ordinary skill in the art will appreciate that the size of the vibrator motor is selected depending on the size of the slot sieve apparatus being vibrated and will be easily able to select a size for a given design. Typically a motor size of less than 1 hp will be quite sufficient. The vibrator motor may be activated at intervals by a timer as is known in the art.

Figure 3:
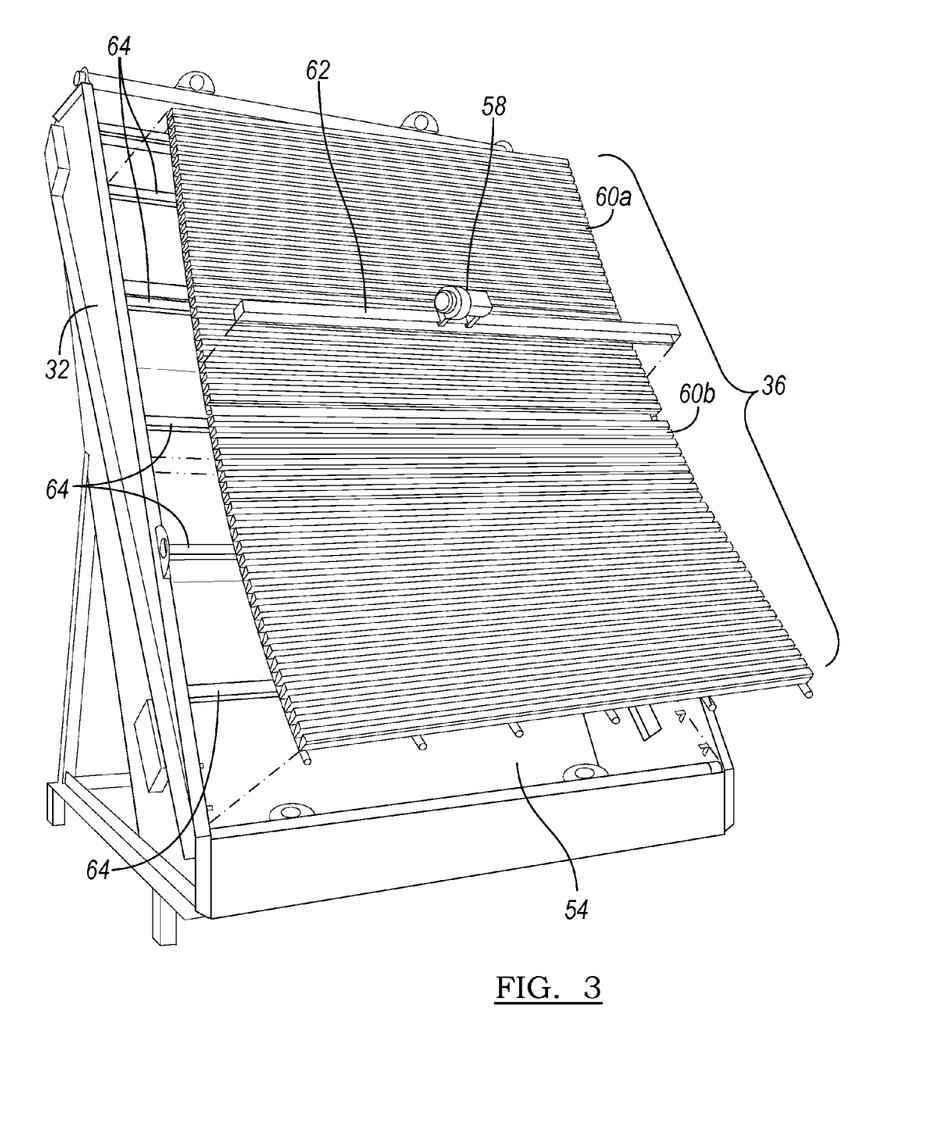
FIG. 3 is a diagram showing a portion of a first stage of a liquid separator that may be used in the present invention including a vibrator motor assembly mechanically coupled to the slot sieve according to one embodiment of the present invention.

Referring now to FIG. 3, an exploded perspective view of the slot sieve assembly is shown. Housing 42 defines a liquid channel 54 oriented at an acute angle such that its top end is positioned higher than a bottom end thereof. The slot sieve assembly 36 is disposed over the channel and has top and bottom ends positioned above the top and bottom ends of the liquid channel 54 and includes a plurality of horizontally oriented members spaced apart to define slots therebetween. In a typical non-limiting embodiment, the slurry separator may have a width of about 8 feet and a height of about 12 feet, although persons skilled in the art will appreciate that other sizes can be used. The slot sieve 36 is mounted on the housing, for example, by resting on a plurality of spaced apart tabs (one of which is shown at reference numeral 56) extending into the volume of the housing 32.

The mechanical vibrator assembly 52 of FIG. 2 includes vibrator motor 58 is mounted to mounting bar 60. Mounting bar 42 is mechanically coupled to the slot sieve assembly 36. Vibrator motor 58 may be a commercially-available vibrator motor having a rotational speed of, for example, 3,600 rpm. Persons of ordinary skill in the art will appreciate that the size of vibrator motor 58 is selected depending on the size of the slot sieve apparatus being vibrated and will be easily able to select a size for a given design. Typically a motor size of less than 1 hp will be quite sufficient. Vibrator motor 58 may be activated at intervals by a timer as is known in the art.

According to one embodiment of the invention, the slot sieve assembly 46 is provided in two sections 60a and 60b. The top of the top section 60a and the bottom of the bottom section 60b are affixed to the housing 32 defining the liquid channel 54. The mating top edge of the bottom section 60b and bottom edge of the top section 60a may be coupled to the mounting bar 62 for vibrator motor 58 using adjustable-tension springs so that the amount of vibration imparted to the slot sieve assembly can be adjusted. Slot sieve assembly also rests on supports 64 that extend across the housing 32. Supports 64 act to divide the slot sieve into vibration zones driven by the motor 58 and reaction zones as disclosed in co-pending application Ser. No. 13/282,403 entitled "VIBRATING SLOT SIEVE SLURRY PROCESSING APPARATUS AND METHOD."

According to one aspect of the present invention, the angle of the top portion of the slot sieve is greater than the angle of the bottom section. In one exemplary embodiment, an angle of about 60° is used for the top portion an angle of about 50° is used for the bottom portion.

Referring again to FIG. 2, the second of three stages includes an inclined conveyor 68 onto which the now partially separated solids are delivered from the end of horizontal conveyor 50. Inclined conveyor 68 having perforations across its surface. The conveyor is driven by a driving mechanism shown at reference numeral 70 set to run at a speed relative to the volume of partially-separated solids it is carrying so as to cause the partially-separated solids to tumble as they travel up the conveyor. The tumbling action serves to separate additional liquid from the partially-separated solids traveling up the conveyor 68. A channel formed from, for example, the housing of the inclined conveyor, directs the additionally removed liquid to a holding tank or pond, depending on the material being processed. The partially-separated solids pass through a tunnel press restrictor 72 disposed at the top of the conveyor.

Figure 4:
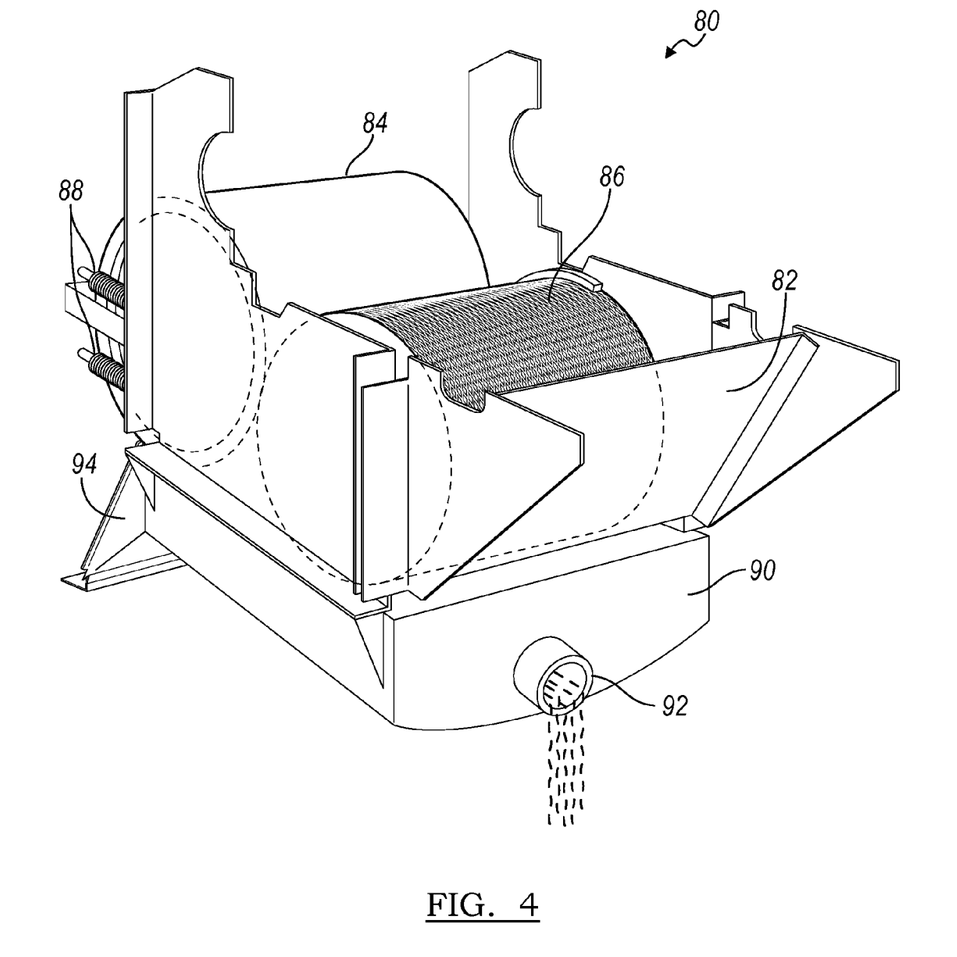
FIG. 4 is a diagram showing a third stage of an illustrative multiple-stage slurry processing apparatus including a roller press assembly disposed at the top of the conveyor.

Referring now to FIG. 4, a diagram shows a third stage of an illustrative multiple-stage slurry processing apparatus including a roller press assembly 80. The roller press assembly 80 is coupled to the top end of the inclined conveyor 68. Roller press assembly 80 includes a housing 82 in which opposed rollers 84 and 86 are rotatably mounted. The axle of roller 84 is mounted on springs 88 that bias it towards roller 86 and is surfaced with an elastomeric material such as rubber. Roller 84 is hollow and has a mesh surface. Rollers 84 and 86 are driven in opposite directions such that the motion of the opposed surfaces of both rollers is downward. The partially-separated solids drop off of the top end of inclined conveyor 68 at a position above and between opposed rollers 84 and 86. The partially-separated solids are squeezed between rollers 84 and 86 to force more of the liquid out of the partially-separated solids. The separated liquid flows through the mesh surface of roller 86 and into a liquid drainage channel 90 formed by the bottom of housing 82. From there it passes through outlet 92. The solids drop off of exit chute 94

Figure 5:
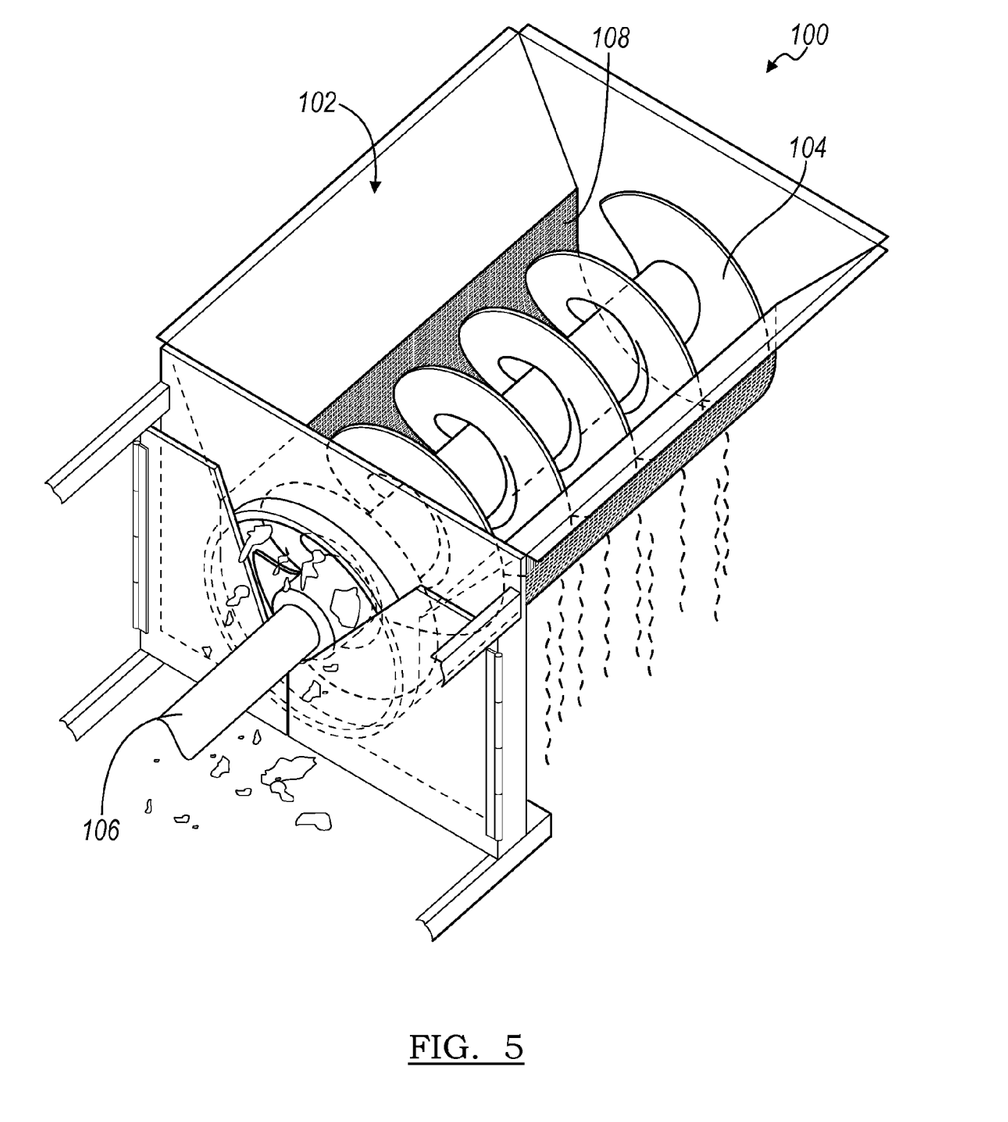
FIG. 5 is a diagram showing a third stage of an illustrative multiple-stage slurry processing apparatus including a screw press assembly disposed at the top of the conveyor.

Referring now to FIG. 5 a diagram shows a third stage of an illustrative multiple-stage slurry processing apparatus including a screw press assembly 100. Screw press assembly 100 includes a housing 102, the upper open end of which forms a hopper into which the partially-separated solids are dropped from the upper end of the inclined conveyor 68. A screw 104 driven by shaft 106 is disposed in a screw channel 108. Screw channel 108 is formed from a mesh material to allow liquids separated by the screw to drain out of the channel.

After the solid and liquid components of the slurry have been separated in the three stages as shown in the figures, the outgoing liquid may be stored in a holding lagoon or pond (not shown).

One advantage of using the present invention over the prior-art slurry separating systems is that the solid material is dryer than would be possible using the prior art systems. In prior art systems, the piles of separated solids retain a much larger amount of water than when the present invention is used. As a result of the high moisture content, the piles of separated solids produced by the prior art processes often spontaneously combust, both ruining the solid material and preventing its use as cow bedding as well as representing a fire hazard.

As previously noted, the systems and methods of the present invention may be employed in a wide variety of applications where it is desired to separate liquid components from solid components in a slurry. Persons of ordinary skill in the art will appreciate that the particular details of embodiments used for different applications, such as the piping and pump sizing, incline angle of the housing, the slot spacing in the slot sieve, the housing dimensions and slurry flow rates will depend somewhat on the particular application. Selection of these details involves no more than the routine exercise of ordinary skill.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A separator system for separating solids from liquids in a slurry comprising:
   a pair of opposing slot sieve separators each including:
      an elongate housing defining a liquid channel along its length, and oriented at an acute angle such that a top end of said housing is positioned higher than a lower end of said housing;
      a slot sieve having a top end positioned above the top end of the liquid channel and a bottom end positioned above the bottom end of the liquid channel and including a plurality of horizontally oriented members spaced apart to define slots therebetween disposed over an open surface of the channel;
      a mechanical vibrator assembly mechanically coupled to said slot sieve to impart mechanical vibration to a vibration zone of the slot sieve;
      a slurry delivery apparatus for delivering the slurry to the slot sieve at a location proximate to the top of the liquid channel; and a liquid removal conduit fluidly coupled to the liquid channel at a location proximate to the bottom end thereof;

an inclined conveyer positioned to pick up a partially-separated volume of solids that drop from the bottom end of each slot sieve separator, the inclined conveyor including perforations across its surface;

a drive mechanism coupled to the conveyor and driven at a speed relative to the volume of partially-separated solids carried on the conveyor such that the conveyor runs at about a full capacity so as to cause the partially-separated solids to tumble as they are transported up the conveyor, the conveyor further including a tunnel press restrictor disposed proximate to the top of the conveyor; and a roller press positioned to accept partially-separated solids passing out of said tunnel press restrictor, said roller press being formed from a pair of two opposed rollers, a first one of the opposed rollers being a screen roller and a second one of the opposed rollers being a rubber faced roller.

2. The separator system of claim 1 further including a liquid removal channel disposed beneath the conveyor.

3. The separator of claim 1 wherein each slot sieve has a slot width of about 0.02 inch.

4. The separator of claim 1 wherein each slot sieve has a slot width of about 0.01 inch.

5. The separator of claim 1 wherein each slot sieve has a slot width of about 0.007 inch.

6. The separator of claim 1 wherein each slot sieve has a slot width of between about 0.007 inch and about 0.01 inch.

7. The separator of claim 1 wherein each slot sieve is formed as a bottom section and a top section.

8. The separator of claim 7 wherein each top section of each slot sieve is disposed at an angle of about 60.degree. and the bottom section of each slot sieve is disposed at an angle of about 50.degree.

9. The separator of claim 7 wherein: the top section of each slot sieve is fixed to the housing at a top end thereof; the bottom section of each slot sieve is fixed to the housing at a bottom end thereof; and, a bottom end of the top section of each slot sieve and a top end of the bottom section of each slot sieve are coupled to the housing by adjustable springs.

\* \* \* \* \*